United States Patent
Yuen

(10) Patent No.: US 7,402,297 B2
(45) Date of Patent: *Jul. 22, 2008

(54) HIGH-SILICA MOLECULAR SIEVE CHA

(75) Inventor: Lun-Teh Yuen, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/259,339

(22) Filed: Oct. 25, 2005

(65) Prior Publication Data

US 2006/0115416 A1    Jun. 1, 2006

Related U.S. Application Data

(60) Provisional application No. 60/631,691, filed on Nov. 29, 2004.

(51) Int. Cl.
*C01B 39/48* (2006.01)

(52) U.S. Cl. .................................. 423/706; 423/335

(58) Field of Classification Search ................ 423/706, 423/335
See application file for complete search history.

(56) References Cited

U.S. PATENT DOCUMENTS

| | | | |
|---|---|---|---|
| 2,942,932 A | 6/1960 | Elliott | |
| 3,030,181 A | 4/1962 | Milton | |
| 3,699,683 A | 10/1972 | Tourtellotte et al. | |
| 3,767,453 A | 10/1973 | Hoekstra | |
| 3,785,998 A | 1/1974 | Hoekstra | |
| 3,920,583 A | 11/1975 | Pugh | |
| 4,297,328 A | 10/1981 | Ritscher et al. | |
| 4,496,786 A | 1/1985 | Santilli et al. | |
| 4,528,279 A | 7/1985 | Suzuki et al. | |
| 4,544,538 A * | 10/1985 | Zones | 423/706 |
| 4,677,242 A | 6/1987 | Kaiser | |
| 4,737,592 A | 4/1988 | Abrams et al. | |
| 4,760,044 A | 7/1988 | Joy, III et al. | |
| 4,791,091 A | 12/1988 | Bricker et al. | |
| 4,861,938 A | 8/1989 | Lewis et al. | |
| 4,868,148 A | 9/1989 | Henk et al. | |
| 4,868,149 A | 9/1989 | Bricker | |
| 5,078,979 A | 1/1992 | Dunne | |
| 6,508,860 B1 | 1/2003 | Kulkarni et al. | |
| 6,709,644 B2 | 3/2004 | Zones et al. | |
| 7,226,575 B2 * | 6/2007 | Yuen et al. | 423/706 |
| 2003/0069449 A1 * | 4/2003 | Zones et al. | 564/463 |
| 2003/0089227 A1 | 5/2003 | Hasse et al. | |
| 2003/0176751 A1 * | 9/2003 | Strohmaier et al. | 585/639 |
| 2005/0054885 A1 * | 3/2005 | Reyes et al. | 568/699 |
| 2005/0096494 A1 * | 5/2005 | Reyes et al. | 585/820 |
| 2005/0154244 A1 * | 7/2005 | Cao et al. | 585/639 |
| 2005/0197520 A1 * | 9/2005 | Mertens et al. | 585/640 |
| 2007/0100185 A1 * | 5/2007 | Cao et al. | 585/639 |

FOREIGN PATENT DOCUMENTS

| | | |
|---|---|---|
| CA | 1 205 980 | 6/1986 |
| GB | 868846 | 5/1961 |

OTHER PUBLICATIONS

Diaz-Cabanas et al. "Synthesis and structure of pure SiO2 chabazite: the SiO2 polymorph with the lowest framework density," Chem. Commun., pp. 1881-1882, 1998.*

Donald W. Breck, Zeolite Molecular Sieves, Jul. 1972, 73-11028, John Wiley & Sons, Inc. Canada.

R.M. Barrer and J.W. Baynham, The Hydrothermal Chemistry of the Silicates, Synthetic Potassium Aluminosilicates, 1955, 2882-2891, Imperial College of Science, London S.W. 7.

W.M. Meier and D.H. Olson, Atlas of Zeolite Structure Types, 1978, 25, Structure Commission on the International Zeolite Association.

Abstract to Russian Article and Copy of Russian Article: Kollist A.; Paris J., ISOLATION Characteristics, And Use Of Polysac Charides From Agar-Containing Algae., 1980, 66065.

M.A. Camblor, et al., Synthesis Of All-Silica And High-Silica Molecular Sieves in Fluoride Media, Topics in Catalysis 9, 1999, 59-76, J.C. Baltzer AG, Science Publishers.

Christopher W. Jones, Synthesis of hydrophobic Molecular Sieves by Hydrothermal Treatment with Acetic Acid, Chem. Matter, 2001, 13, 1041-1050, Published on Web Jan. 23, 2001.

* cited by examiner

*Primary Examiner*—David M Brunsman
(74) *Attorney, Agent, or Firm*—Richard J. Sheridan

(57) ABSTRACT

A method is disclosed for synthesizing high-silica molecular sieves having the CHA crystal structure using a structure directing agent comprising a cation derived from 1-adamantamine, 3-quinuclidinol or 2-exo-aminonorbornane. The synthesis is conducted in the absence of fluorine.

9 Claims, No Drawings

HIGH-SILICA MOLECULAR SIEVE CHA

This application claims benefit under 35 USC §119 of U.S. Provisional Application No. 60/631691, filed Nov. 29, 2004.

BACKGROUND

Chabazite, which has the crystal structure designated "CHA", is a natural zeolite with the approximate formula $Ca_6Al_{12}Si_{24}O_{72}$. Synthetic forms of chabazite are described in "Zeolite Molecular Sieves" by D. W. Breck, published in 1973 by John Wiley & Sons. The synthetic forms reported by Breck are: zeolite "K-G", described in J. Chem. Soc., p. 2822 (1956), Barrer et al.; zeolite D, described in British Patent No. 868,846 (1961); and zeolite R, described in U.S. Pat. No. 3,030,181, issued Apr. 17, 1962 to Milton. Chabazite is also discussed in "Atlas of Zeolite Structure Types" (1978) by W. H. Meier and D. H. Olson.

The K-G zeolite material reported in the J. Chem. Soc. Article by Barrer et al. is a potassium form having a silica:alumina mole ratio (referred to herein as "SAR") of 2.3:1 to 4.15:1. Zeolite D reported in British Patent No. 868,846 is a sodium-potassium form having a SAR of 4.5:1 to 4.9:1. Zeolite R reported in U.S. Pat. No. 3,030,181 is a sodium form which has a SAR of 3.45:1 to 3.65:1.

Citation No. 93:66052y in Volume 93 (1980) of Chemical Abstracts concerns a Russian language article by Tsitsishrili et al. in *Soobsch. Akad. Nauk. Gruz.* SSR 1980, 97(3) 621–4. This article teaches that the presence of tetramethylammonium ions in a reaction mixture containing $K_2O$—$Na_2O$—$SiO_2$—$Al_2O_3$—$H_2O$ promotes the crystallization of chabazite. The zeolite obtained by the crystallization procedure has a SAR of 4.23.

The molecular sieve designated SSZ-13, which has the CHA crystal structure, is disclosed in U.S. Pat. No. 4,544,538, issued Oct. 1, 1985 to Zones. SSZ-13 is prepared from nitrogen-containing cations derived from 1-adamantamine, 3-quinuclidinol and 2-exo-aminonorbornane. Zones discloses that the SSZ-13 of U.S. Pat. No. 4,544,538 has a composition, as-synthesized and in the anhydrous state, in terms of mole ratios of oxides as follows:

(0.5 to 1.4)$R_2O$:(0 to 0.5)$M_2O$:$W_2O_3$:(greater than 5)$YO_2$ wherein M is an alkali metal cation, W is selected from aluminum, gallium and mixtures thereof, Y is selected from silicon, germanium and mixtures thereof, and R is an organic cation. As prepared, the silica:alumina mole ratio is typically in the range of 8:1 to about 50:1, higher mole ratios can be obtained by varying the relative ratios of reactants. It is disclosed that higher mole ratios can also be obtained by treating the SSZ-13 with chelating agents or acids to extract aluminum from the SSZ-13 lattice. It is further stated that the silica:alumina mole ratio can also be increased by using silicon and carbon halides and similar compounds.

U.S. Pat. No. 4,544,538 also discloses that the reaction mixture used to prepare SSZ-13 has a $YO_2/W_2O_3$ mole ratio (e.g., SAR) in the range of 5:1 to 350:1. It is disclosed that use of an aqueous colloidal suspension of silica in the reaction mixture to provide a silica source allows production of SSZ-13 having a relatively high silica:alumina mole ratio.

U.S. Pat. No. 4,544,538 does not, however, disclose SSZ-13 having a silica:alumina mole ratio greater than 50.

U.S. Pat. No. 6,709,644, issued Mar. 23, 2004 to Zones et al., discloses aluminosilicate zeolites having the CHA crystal structure and having small crystallite sizes (designated SSZ-62). The reaction mixture used to prepare SSZ-62 has a $SiO_2/Al_2O_3$ mole ratio of 20–50. It is disclosed that the zeolite can be used for separation of gasses (e.g., separating carbon dioxide from natural gas), and in catalysts used for the reduction of oxides of nitrogen in a gas stream (e.g., automotive exhaust), converting lower alcohols and other oxygenated hydrocarbons to liquid products, and for producing dimethylamine.

M. A. Camblor, L. A. Villaescusa and M. J. Diaz-Cabanas, "Synthesis of All-Silica and High-Silica Molecular Sieves in Fluoride Media", Topics in Catalysis, 9 (1999), pp. 59–76 discloses a method for making all-silica or high-silica zeolites, including chabazite. The chabazite is made in a reaction mixture containing fluoride and a N,N,N-trimethyl-1-adamantammonium structure directing agent. Camblor et al. does not, however, disclose the synthesis of all- or high-silica chabazite from a hydroxide-containing reaction mixture.

SUMMARY OF THE INVENTION

In accordance with this invention there is provided a method for preparing a molecular sieve having the CHA crystal structure and a mole ratio of greater than 50:1 of (1) silicon oxide, germanium oxide and mixtures thereof to (2) aluminum oxide, iron oxide, titanium oxide, gallium oxide and mixtures thereof, said method comprising:

A. forming an aqueous reaction mixture comprising a composition in terms of mole ratios falling within the following ranges:

| | |
|---|---|
| $YO_2/W_aO_b$ | 220–∞ (preferably 350–5500) |
| $OH^-/YO_2$ | 0.19–0.52 |
| $Q/YO_2$ | 0.15–0.25 |
| $M_{2/n}O/YO_2$ | 0.04–0.10 |
| $H_2O/YO_2$ | 10–50 | wherein Y is silicon, germanium or mixtures thereof, W is aluminum, iron, titanium, gallium or mixtures thereof, a is 1 or 2 and b is 2 when a is 1 (i.e., W is tetravalent) or b is 3 when a is 2 (i.e., W is trivalent); M is an alkali metal or alkaline earth metal, n is the valence of M, and Q is a cation derived from 1-adamantamine, 3-quinuclidinol or 2-exo-aminonorbornane; and B. maintaining said aqueous mixture under sufficient crystallization conditions until crystals are formed.

It should be noted that the reaction mixture does not contain fluorine. Thus, the reaction can be run in the absence of fluoride.

In accordance with this invention, there is also provided a high-silica molecular sieve having the CHA crystal structure and having a composition, as-synthesized and in the anhydrous state, in terms of mole ratios of oxides as follows:

| | |
|---|---|
| $O_2/W_cO_d$ | Greater than 50–∞ (e.g., >50–1500 or 200–1500) |
| $M_{2/n}O/YO_2$ | 0.04–0.15 |
| $Q/YO_2$ | 0.15–0.25 | wherein Y is silicon, germanium or mixtures thereof, W is aluminum, iron, titanium, gallium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is a cation derived from 1-adamantamine, 3-quinuclidinol or 2-exo-aminonorbornane. The as-synthesized material does not contain fluoride.

There is also provided in accordance with the present invention a molecular sieve having the CHA crystal structure and having a mole ratio of greater than 50 to 1000 of (1) an oxide selected from silicon oxide, germanium oxide or mixtures thereof to (2) an oxide selected from aluminum oxide, iron oxide, titanium oxide, gallium oxide or mixtures thereof. In one embodiment, the molecular sieve has a mole ratio of oxide (1) to oxide (2) is 200–1500.

DETAILED DESCRIPTION

The present invention relates to a method of preparing high-silica molecular sieves having the CHA crystal structure and the molecular sieves so prepared. As used herein, the term "high-silica" means the molecular sieve has a mole ratio of (1) silicon oxide, germanium oxide and mixtures thereof to (2) aluminum oxide, iron oxide, titanium oxide, gallium oxide and mixtures thereof of greater than 50. This includes all-silica molecular sieves in which the ratio of (1):(2) is infinity, i.e., there is essentially none of oxide (2) in the molecular sieve.

One advantage of the present invention is that the reaction is conducted in the presence of hydroxide rather than fluoride. HF-based syntheses generally require a large amount of structure directing agent ("SDA"). Typical HF-based reactions will have a SDA/SiO$_2$ mole ratio of 0.5.

High-silica CHA molecular sieves can be suitably prepared from an aqueous reaction mixture containing sources of an alkali metal or alkaline earth metal oxide; sources of an oxide of silicon, germanium or mixtures thereof; optionally, sources of aluminum oxide, iron oxide, titanium oxide, gallium oxide and mixtures thereof; and a cation derived from 1-adamantamine, 3-quinuclidinol or 2-exo-aminonorbornane. The mixture should have a composition in terms of mole ratios falling within the ranges shown in Table A below:

TABLE A

| | |
|---|---|
| YO$_2$/W$_a$O$_b$ | 220–∞(preferably 350–5500) |
| OH—/YO$_2$ | 0.19–0.52 |
| Q/YO$_2$ | 0.15–0.25 |
| M$_{2/n}$O/YO$_2$ | 0.04–0.10 |
| H$_2$O/YO$_2$ | 10–50 | wherein Y is silicon, germanium or mixtures thereof, W is aluminum, iron, titanium, gallium or mixtures thereof, M is an alkali metal or alkaline earth metal, n is the valence of M (i.e., 1 or 2) and Q is a cation derived from 1-adamantamine, 3-quinuclidinol or 2-exo-aminonorbornane.

The cation derived from 1-adamantamine can be a N,N,N-trialkyl-1-adamantammonium cation which has the formula:

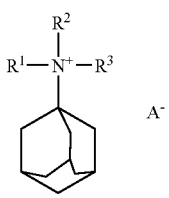

where R$^1$, R$^2$, and R$^3$ are each independently a lower alkyl, for example methyl. The cation is associated with an anion, A$^-$, which is not detrimental to the formation of the molecular sieve. Representative of such anions include halogens, such as chloride, bromide and iodide; hydroxide; acetate; sulfate and carboxylate. Hydroxide is the preferred anion. It may be beneficial to ion exchange, for example, a halide for hydroxide ion, thereby reducing or eliminating the alkali metal or alkaline earth metal hydroxide required.

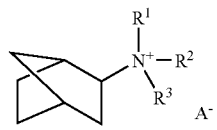

The cation derived from 2-exo-aminonorbornane can have the formula:

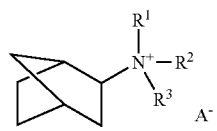

where R$^1$, R$^2$, R$^3$ and A are as defined above.

The reaction mixture is prepared using standard molecular sieve preparation techniques. Typical sources of silicon oxide include fumed silica, silicates, silica hydrogel, silicic acid, colloidal silica, tetra-alkyl orthosilicates, and silica hydroxides. Examples of such silica sources include CAB-O-SIL M5 fumed silica and Hi-Sil hydrated amorphous silica, or mixtures thereof. Typical sources of aluminum oxide include aluminates, alumina, hydrated aluminum hydroxides, and aluminum compounds such as AlCl$_3$ and Al$_2$(SO$_4$)$_3$. Sources of other oxides are analogous to those for silicon oxide and aluminum oxide.

It has been found that seeding the reaction mixture with CHA crystals both directs and accelerates the crystallization, as well as minimizing the formation of undesired contaminants. In order to produce pure phase high-silica CHA crystals, seeding may be required. When seeds are used, they can be used in an amount that is about 2–3 wt. % based on the weight of YO$_2$.

The reaction mixture is maintained at an elevated temperature until CHA crystals are formed. The temperatures during the hydrothermal crystallization step are typically maintained from about 120° C. to about 160° C. It has been found that a temperature below 160° C., e.g., about 120° C. to about 140° C., is useful for producing high-silica CHA crystals without the formation of secondary crystal phases.

In one embodiment, the reaction mixture contains seeds of CHA crystals and the reaction mixture is maintained at a temperature of less than 160° C., for example 120° C. to 140° C.

The crystallization period is typically greater than 1 day and preferably from about 3 days to about 7 days. The hydrothermal crystallization is conducted under pressure and usually in an autoclave so that the reaction mixture is subject to autogenous pressure. The reaction mixture can be stirred, such as by rotating the reaction vessel, during crystallization.

Once the high-silica CHA crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized crystals. The drying step can be performed at atmospheric or subatmospheric pressures.

The high-silica CHA can be made with a mole ratio of $YO_2/W_cO_d$ of ∞, i.e., there is essentially no $W_cO_d$ present in the CHA. In this case, the CHA would be an all-silica material or a germanosilicate. Thus, in a typical case where oxides of silicon and aluminum are used, CHA can be made essentially aluminum free, i.e., having a silica to alumina mole ratio of ∞. A method of increasing the mole ratio of silica to alumina is by using standard acid leaching or chelating treatments. The high-silica CHA can also be made by first preparing a borosilicate CHA and then removing the boron. The boron can be removed by treating the borosilicate CHA with acetic acid at elevated temperature (as described in Jones et al., *Chem. Mater.*, 2001, 13, pp. 1041–1050) to produce an all-silica version of CHA.

The high-silica CHA molecular sieve has a composition, as-synthesized and in the anhydrous state, in terms of mole ratios of oxides as indicated in Table B below:

TABLE B

| As-Synthesized High-Silica CHA Composition | |
|---|---|
| $YO_2/W_cO_d$ | Greater than 50–∞ |
|  | (e.g., >50–1500 or 200–1500) |
| $M_{2/n}O/YO_2$ | 0.04–0.15 |
| $Q/YO_2$ | 0.15–0.25 | wherein Y is silicon, germanium or mixtures thereof, W is aluminum, iron, titanium, gallium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is a cation derived from 1-adamantamine, 3-quinuclidinol or 2-exo-aminonorbornane. The as-synthesized material does not contain fluoride.

The present invention also provides a molecular sieve having the CHA crystal structure and having a mole ratio of greater than 50 to 1500 of (1) an oxide selected from silicon oxide, germanium oxide or mixtures thereof to (2) an oxide selected from aluminum oxide, iron oxide, titanium oxide, gallium oxide or mixtures thereof. In one embodiment, the molecular sieve has a mole ratio of oxide (1) to oxide (2) is 200–1500.

High-silica CHA molecular sieves can be used as-synthesized or can be thermally treated (calcined). By "thermal treatment" is meant heating to a temperature from about 200° C. to about 820° C., either with or without the presence of steam. Usually, it is desirable to remove the alkali metal cation by ion exchange and replace it with hydrogen, ammonium, or any desired metal ion. Thermal treatment including steam helps to stabilize the crystalline lattice from attack by acids.

The high silica CHA molecular sieves, as-synthesized, have a crystalline structure whose X-ray powder diffraction ("XRD") pattern shows the following characteristic lines:

TABLE I

| As-Synthesized High Silica CHA XRD | | |
|---|---|---|
| 2 Theta[a] | d-spacing (Angstroms) | Relative Intensity[b] |
| 9.64 | 9.17 | S |
| 14.11 | 6.27 | M |
| 16.34 | 5.42 | VS |
| 17.86 | 4.96 | M |
| 21.03 | 4.22 | VS |
| 25.09 | 3.55 | S |
| 26.50 | 3.36 | W–M |
| 30.96 | 2.89 | W |
| 31.29 | 2.86 | M |
| 31.46 | 2.84 | W |

[a]±0.10
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table IA below shows the X-ray powder diffraction lines for as-synthesized high silica CHA including actual relative intensities.

TABLE IA

| As-Synthesized High Silica CHA XRD | | |
|---|---|---|
| 2 Theta[a] | d-spacing (Angstroms) | Relative Intensity(%) |
| 9.64 | 9.17 | 50.8 |
| 13.16 | 6.72 | 4.4 |
| 14.11 | 6.27 | 23.1 |
| 16.34 | 5.42 | 82.4 |
| 17.86 | 4.96 | 21.7 |
| 19.34 | 4.59 | 6.1 |
| 21.03 | 4.22 | 100 |
| 22.24 | 3.99 | 11.0 |
| 22.89 | 3.88 | 10.7 |
| 23.46 | 3.79 | 4.9 |
| 25.09 | 3.55 | 43.1 |
| 26.50 | 3.36 | 19.5 |
| 28.25 | 3.16 | 4.7 |
| 28.44 | 3.14 | 1.5 |
| 30.14 | 2.96 | 3.2 |
| 30.96 | 2.89 | 14.3 |
| 31.29 | 2.86 | 37.5 |
| 31.46 | 2.84 | 12.0 |
| 33.01 | 2.71 | 1.8 |
| 33.77 | 2.65 | 1.9 |
| 34.05 | 2.63 | 0.2 |
| 35.28 | 2.54 | 3.6 |
| 35.69 | 2.51 | 0.7 |
| 36.38 | 2.47 | 5.8 |
| 39.22 | 2.30 | 1.0 |
| 39.81 | 2.26 | 0.8 |

[a]±0.10

After calcination, the high silica CHA molecular sieves have a crystalline structure whose X-ray powder diffraction pattern include the characteristic lines shown in Table II:

TABLE II

| Calcined High Silica CHA XRD | | |
|---|---|---|
| 2 Theta[a] | d-spacing (Angstroms) | Relative Intensity |
| 9.65 | 9.2 | VS |
| 13.08 | 6.76 | M |
| 16.28 | 5.44 | W |
| 18.08 | 4.90 | W |
| 20.95 | 4.24 | M |
| 25.37 | 3.51 | W |
| 26.36 | 3.38 | W |
| 31.14 | 2.87 | M |

TABLE II-continued

Calcined High Silica CHA XRD

| 2 Theta[a] | d-spacing (Angstroms) | Relative Intensity |
|---|---|---|
| 31.61 | 2.83 | W |
| 35.10 | 2.55 | W |

[a] ±0.10

Table IIA below shows the X-ray powder diffraction lines for calcined high silica CHA including actual relative intensities.

TABLE IIA

Calcined High Silica CHA XRD

| 2 Theta[a] | d-spacing (Angstroms) | Relative Intensity(%) |
|---|---|---|
| 9.65 | 9.2 | 100 |
| 13.08 | 6.76 | 29.3 |
| 14.21 | 6.23 | 3.9 |
| 16.28 | 5.44 | 15.2 |
| 18.08 | 4.90 | 16.1 |
| 19.37 | 4.58 | 2.3 |
| 20.95 | 4.24 | 36.8 |
| 22.38 | 3.97 | 1.9 |
| 22.79 | 3.90 | 1.9 |
| 23.44 | 3.79 | 1.5 |
| 25.37 | 3.51 | 14.1 |
| 26.36 | 3.38 | 9.5 |
| 28.12 | 3.17 | 2.0 |
| 28.65 | 3.11 | 1.9 |
| 30.07 | 2.97 | 1.0 |
| 31.14 | 2.87 | 22.0 |
| 31.36 | 2.85 | 2.9 |
| 31.61 | 2.83 | 9.3 |
| 32.14 | 2.78 | 0.9 |
| 32.90 | 2.72 | 1.0 |
| 34.03 | 2.63 | 2.1 |
| 35.10 | 2.55 | 4.3 |
| 36.64 | 2.45 | 3.3 |
| 39.29 | 2.29 | 1.3 |
| 40.40 | 2.23 | 2.6 |

[a] ±0.10

The X-ray powder diffraction patterns were determined by standard techniques. The radiation was the K-alpha/doublet of copper and a scintillation counter spectrometer with a strip-chart pen recorder was used. The peak heights I and the positions, as a function of 2 Theta where Theta is the Bragg angle, were read from the spectrometer chart. From these measured values, the relative intensities, $100 \times I/I_o$, where $I_o$ is the intensity of the strongest line or peak, and d, the interplanar spacing in Angstroms corresponding to the recorded lines, can be calculated.

Variations in the diffraction pattern can result from variations in the mole ratio of oxides from sample to sample. The molecular sieve produced by exchanging the metal or other cations present in the molecular sieve with various other cations yields a similar diffraction pattern, although there can be shifts in interplanar spacing as well as variations in relative intensity. Calcination can also cause shifts in the X-ray diffraction pattern. Also, the symmetry can change based on the relative amounts of boron and aluminum in the crystal structure. Notwithstanding these perturbations, the basic crystal lattice structure remains unchanged.

High-silica CHA molecular sieves are useful in useful in adsorption, in catalysts useful in converting methanol to olefins, synthesis of amines (such as dimethylamine), in the reduction of oxides of nitrogen in gasses (such as automobile exhaust), and in gas separation.

EXAMPLES

Examples 1–16

High silica CHA is synthesized by preparing the gel compositions, i.e., reaction mixtures, having the compositions, in terms of mole ratios, shown in the table below. The resulting gel is placed in a Parr bomb reactor and heated in an oven at the temperature indicated below while rotating at the speed indicated below. Products are analyzed by X-ray diffraction (XRD) and found to be high silica molecular sieves having the CHA structure. The source of silicon oxide is Cabosil M-5 fumed silica or HiSil 233 amorphous silica (0.208 wt. % alumina). The source of aluminum oxide is Reheis F 2000 alumina.

| Ex. No. | $SiO_2/Al_2O_3$ | $OH^-/SiO_2$ | $SDA^1/SiO_2$ | $Na^+/SiO_2$ | $H_2O/SiO_2$ | Wt. % Seed | Rxn. Cond.[2] | Yield (g) | Product Actual $SiO_2/Al_2O_3$ | Product Estimated $SiO_2/Al_2O_3$ |
|---|---|---|---|---|---|---|---|---|---|---|
| 1 | 1,731[4] | 0.34 | 0.18 | 0.16 | 15.62 | 4.12 | 120/43/6 | 0.08 | | 95 |
| 2 | 1,907 | 0.36 | 0.18 | 0.19 | 15.68 | 4.12 | 120/43/8 | 0.10 | | 131 |
| 3 | 224[3] | 0.19 | 0.18 | 0.01 | 16.59 | 4.02 | 120/43/7 | 13.39 | 166 | |
| 4 | 221[3] | 0.36 | 0.18 | 0.18 | 16.16 | 4.15 | 120/43/7 | 1.29 | 167 | |
| 5 | 2,485[4] | 0.36 | 0.18 | 0.18 | 16.03 | 4.12 | 120/43/7 | 0.11 | | 188 |
| 6 | 296[4] | 0.37 | 0.18 | 0.19 | 15.84 | 4.16 | 120/43/6 | 0.98 | | 201 |
| 7 | 1,731 | 0.36 | 0.18 | 0.19 | 15.68 | 4.12 | 120/43/5 | 0.18 | | 214 |
| 8 | 407[4] | 0.40 | 0.21 | 0.19 | 44.39 | 2.01 | 160/43/4 | 0.53 | | 290 |
| 9 | 435 | 0.42 | 0.21 | 0.21 | 45.81 | 4.02 | 150/100/4 | 15.03 | 296 | |
| 10 | 982[4] | 0.42 | 0.31 | 0.11 | 28.03 | 2.78 | 140/43/5 | 0.38 | | 346 |
| 11 | 350[3] | 0.36 | 0.18 | 0.18 | 16.16 | 4.15 | 120/43/5 | 1.43 | | 347 |
| 12 | 1,731[4] | 0.36 | 0.18 | 0.19 | 15.68 | 4.12 | 12C/43/6 | 0.33 | 584 | |
| 13 | 980[4] | 0.33 | 0.25 | 0.08 | 22.70 | 2.78 | 140/43/5 | 0.92 | | 628 |
| 14 | 4,135 | 0.36 | 0.17 | 0.19 | 15.86 | 5.01 | 120/200/5 | 6.90 | 682 | |
| 15 | 5,234 | 0.33 | 0.15 | 0.18 | 11.62 | 4.7 | 120/43/4 | 0.3 | | 783 |
| 16 | 4,104 | 0.37 | 0.18 | 0.19 | 18.11 | 5.01 | 120/75/5 | 7.37 | 1,394 | |

[1] SDA = Cation derived from 1-adamantamine
[2] ° C./RPM/Days
[3] $SiO_2$ source = Hi Sil
[4] $SiO_2$ source = CAB-O-SIL The product of each reaction is a crystalline molecular sieve having the CHA structure.

What is claimed is:

1. A method for preparing a molecular sieve having the CHA crystal structure and a mole ratio of greater than 50:1 of (1) silicon oxide, germanium oxide and mixtures thereof to (2) aluminum oxide, iron oxide, titanium oxide, gallium oxide and mixtures thereof said method comprising:

A. forming an aqueous reaction mixture comprising a composition in terms of mole ratios falling within the following ranges:

| | |
   |---|---|
   | $YO_2/W_aO_b$ | 400–∞ |
   | OH—/$YO_2$ | 0.19–0.52 |
   | Q/$YO_2$ | 0.15–0.25 |
   | $M_{2/n}O/YO_2$ | 0.04–0.10 |
   | $H_2O/YO_2$ | 10–50 | wherein Y is silicon, germanium or mixtures thereof, W is aluminum, iron, titanium, gallium or mixtures thereof, a is 1 or 2, b is 2 when a is 1 or b is 3 when a is 2; M is an alkali metal or alkaline earth metal, n is the valence of M, and Q is a cation derived from 1-adamantamine, 3-quinuclidinol or 2-exo-aminonorbornane; and B. maintaining said aqueous mixture under sufficient crystallization conditions until crystals are formed wherein the molecular sieve is prepared in the absence of fluorine.

2. the method of claim 1 wherein the reaction mixture further comprises seeds of a molecular sieve having the CHA structure.

3. The method of claim 2 wherein the reaction mixture is heated to a temperature of about 120° C. to about 140° C.

4. The method of claim 1 wherein the reaction mixture is heated at a temperature of about 120° C. to about 160° C.

5. The method of claim 4 wherein the reaction mixture is heated to a temperature of about 120° C. to about 140° C.

6. The Method of claim 1 wherein $YO_2/W_aO_b$ is infinity.

7. A molecular sieve having the CHA crystal structure and having a composition, as-synthesized and in the anhydrous state, in terms of mole ratios of oxides as follows:

| | |
   |---|---|
   | $YO_2/W_cO_d$ | 200–∞ |
   | $M_{2/n}O/YO_2$ | 0.04–0.15 |
   | Q/$YO_2$ | 0.15–0.25 | wherein Y is silicon, germanium or mixtures thereof, W is aluminum, iron, titanium, gallium or mixtures thereof; c is 1 or 2; d is 2 when c is 1 or d is 3 or 5 when c is 2; M is an alkali metal cation, alkaline earth metal cation or mixtures thereof; n is the valence of M; and Q is a cation derived from 1-adamantamine, 3-quinuclidinol or 2-exo-aminonorbornane and wherein the as-synthesized molecular sieve does not contain fluorine.

8. The molecular sieve of claim 7 wherein $YO_2/W_cO_d$ is 200–1500.

9. The molecular sieve of claim 7 wherein $YO_2/W_cO_d$ is infinity.

* * * * *